United States Patent [19]

Allingham et al.

[11] 4,298,384
[45] Nov. 3, 1981

[54] ANTIFOULING PAINTS FOR MARINE USE

[75] Inventors: Yael Allingham; David Vofsi, both of Rehovot, Israel

[73] Assignee: Yeda Research and Development Company, Ltd., Rehovot, Israel

[21] Appl. No.: 58,707

[22] Filed: Jul. 18, 1979

[30] Foreign Application Priority Data

Jul. 23, 1978 [IL] Israel ............................... 55203

[51] Int. Cl.³ .......................... C09D 5/14; C09D 5/16
[52] U.S. Cl. .............................. 106/18.34; 106/18.35;
260/29.6 MQ; 424/304; 424/308; 428/541
[58] Field of Search ............... 106/15.05, 18.34, 18.35;
260/29.6 MQ; 428/541

[56] References Cited

U.S. PATENT DOCUMENTS

| | | | |
|---|---|---|---|
| 3,063,894 | 11/1962 | Heininger et al. | 424/304 |
| 3,140,304 | 7/1964 | Chodsky et al. | 260/434 |
| 3,140,306 | 7/1964 | Heininger et al. | 260/465.7 |
| 3,140,307 | 8/1964 | Heininger et al. | 106/18.32 |
| 3,159,532 | 12/1964 | Heininger et al. | 434/304 |
| 3,238,094 | 3/1966 | Heininger et al. | 106/18.32 |
| 4,018,611 | 12/1978 | Cramer et al. | 260/29.6 MQ |
| 4,130,434 | 12/1978 | Arbir | 260/29.61 MQ |

FOREIGN PATENT DOCUMENTS

| | | | |
|---|---|---|---|
| 231139 | 10/1960 | Australia | 106/15.05 |
| 851902 | 10/1960 | United Kingdom | 106/15.05 |
| 1062324 | 3/1967 | United Kingdom | 106/15.05 |
| 1107929 | 3/1968 | United Kingdom | 106/15.05 |
| 579294 | 10/1975 | U.S.S.R. | 106/15.05 |

OTHER PUBLICATIONS

"Antifouling Paints", Young et al., *Industrial & Engineering Chemistry*, vol. 35, No. 4, pp. 432-438.
"Action of Antifouling Paints", Ferry et al., *Industrial & Engineering Chemistry*, vol. 38, No. 7, pp. 699-700.

*Primary Examiner*—Morton Foelak
*Attorney, Agent, or Firm*—Ladas & Parry

[57] ABSTRACT

The present invention relates to antifouling paints for marine use comprising a conventional paint base containing as active ingredient a compound of the formula

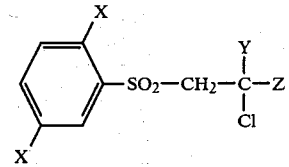

wherein
X is selected from chlorine and bromine,
Y is selected from hydrogen and lower alkyl, and
Z is selected from —COOR wherein R is lower alkyl, and —CN, possibly in combination with a conventional antifouling agent, and to the protection of marine structures and marine vessels which comprises applying such an antifouling paint to such structures and vessels.

5 Claims, No Drawings

ANTIFOULING PAINTS FOR MARINE USE

FIELD OF THE INVENTION

The present invention relates to novel antifouling paints for marine use, which comprise a conventional paint base of the type used in antifouling paints, and as active ingredient a 2,5-dichloro- or 2,5-dibromo-phenyl ethylsulfone as defined hereinafter. According to a specific embodiment of the invention there is used as active ingredient a combination of a phenyl-ethylsulfone compound as defined and a quantity of a conventional antifouling agent. The invention also relates to a method for protecting marine structures against fungal attack, which comprises applying an antifouling paint according to the invention.

BACKGROUND OF THE INVENTION

There are known various antifouling paints which are based on metallic toxicants, mainly copper and tin compounds. Heavy metals of this type are undesired from an environmental point of view. According to the present invention there are provided antifouling paints which afford a very good protection of marine structure, and which are either free of heavy metal salts or which contain these in a substantially decreased quantity. Various phenyl-ethylsulfone compounds are known, but the main use of these is in insecticidal, acaricidal and fungicidal compositions of matter. Such compounds have not been used hitherto as active ingredients in antifouling paints for use with marine structures.

SUMMARY OF THE INVENTION

The present invention relates to antifouling paints for marine use, comprising a conventional paint base of the type used in marine antifouling paints, and as active ingredient a compound of the formula

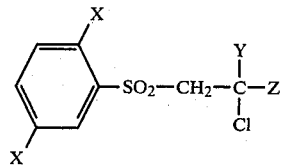

wherein

X is selected from chlorine and bromine,
Y is selected from hydrogen and lower alkyl,
Z is selected from —COOR wherein R is lower alkyl, and —CN, possibly in combination with a small quantity of a conventional antifouling agent. The invention also relates to a method for the protection of marine structures which comprises applying to such structures an effective quantity of an antifouling paint of the present invention.

Amongst specific compounds which are effective ingredients for use in antifouling paints of the present invention are 2,5-dichlorophenyl-β-chloro, β-methyl, β-carboxymethyl-ethylsulfone; 2,5-dichlorophenyl-β-carboxymethyl, β-chloroethyl sulfone; β-(2,5-dichlorophenylsulfone)α-chloropropionitrile; 2,5-dibromophenyl-β-chloro, β-carboxymethyl ethylsulfone. Compounds of this type can be used efficiently either by themselves, at a percentage of the paint of about 5 to 30 percent by weight of the paint, or in combination with a smaller quantity of a conventional antifouling agent. Generally a ratio of the novel compounds to conventional compound of about 3:1 to about 5:1 is effective.

Compounds of the type used as active ingredients according to the present invention are known. Compounds of this type have been described in U.S. Pat. Nos. 3,140,304 and 3,063,894, where these compounds are stated to have fungicidal and bactericidal properties. The effectivity of compounds of this kind against parasitic marine growth was not known hitherto and could not be predicted.

The antifouling paints of the present invention are advantageously based on the paint bases conventionally used with such paints. Such paint bases are frequently vinylic paints. It was found that very good results can be attained by the use of phenyl-ethylsulfone compounds of the type defined above by themselves. Very good results can also be attained by using such compounds in combination with a certain quantity of a conventional antifouling agent. As the metallic component of conventional antifouling paints is not desirable, the conventional constituent is advantageously used in a lower percentage than that of the halophenyl-ethylsulfone compound.

Comparative tests were carried out in order to evaluate the efficacy of the compositions of the present invention compared with that of conventional effective antifouling paints. An identical paint base was used, with the novel active agents according to the present invention. Some of the compositions tested contained only halophenylethylsulfone compounds as defined above, and some contained these in combination with conventional antifouling agents. The protection afforded by the antifouling paints of the present invention was generally at least the same as that of conventional antifouling paints containing as active ingredients copper oxide, tri-n-butyl tin oxide and the like. The novel compositions contain substantially less metallic constituents, and this is a considerable advantage from an environmental point of view.

A typical test was carried out with a 62 cm×33 cm×0.5 cm iron plates which were cleaned by sand blasting. First there were applied two coatings of conventional commercial undercoat paints, 60 microns and 80 microns thick respectively, and on top of these there was applied a coating of the novel antifouling paint of the invention, 80 microns thick. The comparative samples were coated with the same undercoats and with a conventional antifouling paint. The plates were placed side by side at a very contaminated area of Haifa Bay and the plates were checked after a period of eight months. The results are summarized in the following Table I, and the results demonstrate the efficacy of the novel compositions of the present invention. The composition (5) has a medium effectivity, while the compound (6) which is a good fungicide has no effectivity. It is not possible to predict antifouling effectivity on the basis of other biocidal properties of such compounds.

The invention is described by way of illustration with reference to the following examples, which are to be construed in a non-limitative manner.

EXAMPLE 1

Preparation of 2,5-dichlorophenyl β-chloro β-methyl β-carboxy methylethylsulfone To 125 g of 2,5-dichlorobenzene sulfonylchloride and 50 g α-methylmethacrylate there was added 0.8 g cupric chloride and 1.2 g triethylamine hydrochloride dissolved in acetonitrile. The mixture was heated under reflux at a bath temperature of 120° C. during 10 hours. The reaction mixture was cooled, poured into 250 ml ethanol and after cooling the mixture was suction filtered. The thus obtained solid was recrystallized from ethanol, yield 85%, M.P.=101° C.

EXAMPLE 2

Preparation of β-(2,5-dichlorophenylsulfone) α-chloropropionitrile

To 50 g 2,5-dichlorobenzenesulfonyl chloride and 25 g acrylonitrile there was added 0.3 g cupric chloride and 0.03 g copper bronze. The reaction mixture was heated during 10 hours with vigorous stirring at a bath temperature of 120° C. The reaction mixture was poured into 200 ml ethanol and after filtration with suction the solid was recrystallized from ethanol, yield 80%, M.P.-136° C.

EXAMPLE 3

β-(2,5-dichlorophenylsulfone)-α-chloro- α-methyl propionitrile

The compound was prepared according to Example 2 with 2,5-dichlorobenzenesulfonyl chloride and an equivalent amount of methacrylonitrile, yield 95%, M.P. 119° C.

EXAMPLE 4

Preparation of 2,5-dibromophenyl β-chloro, β-methyl, β-carboxy methylethylsulfone This compound was prepared exactly according to the process of Example 1 starting with an equivalent quantity of 2,5-dibromobenzenesulfonyl chloride. The compound was obtained in 82% yield, M.P.=103° C.

EXAMPLE 5

Preparation of 2,5-dichlorophenyl β-carboxymethyl, β-chloroethyl sulfone

A mixture of 25 g of 2,5-dichlorobenzenesulfonyl chloride, 28 g methyl acrylate, 0.4 g cuprous chloride, 0.6 g triethyl ammonium chloride and 10 ml acetonitrile was refluxed for 24 hours. After cooling the product was recrystallized from isopropanol, yield 50%, M.P.=69° C.

EXAMPLE 6

Preparation of 2,5-dichlorophenyl β,β,β-trichloroethyl sulfone

The compound was prepared according to Example 1, starting with 2,5-dichlorobenzenesulfonyl chloride and vinyl chloride. M.P.=96° C.

COMPARATIVE TESTS

Iron plates of 62 cm×33 cm=0.5 cm were cleaned by sand blasting to Sa 2.5 grade. There was applied a coating of 60 microns of Templast Silver 820 Paint (dry coat), and on it a coating of 80 microns (dry coat) of Templast Silver 821 HB paints, produced by Tambour-Askar Ltd., Acre, Israel. The antifouling paints tested were conventional antifouling paints, and antifouling paints according to the present invention. In all cases there was used as paint base a vinylic paint base used by Tambour-Askar as basis of its Tamarin antifouling paint, which base was supplied without any active antifouling agents. There were applied two coats of the antifouling paint, each of 40 microns thickness (dry).

The results are summarized in Table I. The first four examples demonstrate antifouling paints according to the invention containing only phenylethyl sulfones. Examples 7 and 8 illustrate the combination of such compounds with tri n-butyl tin oxide. Examples 9 and 10 are commercial antifouling paints. Example 5 illustrates a phenylethyl sulfone with lesser effectivity. Example 6 illustrates a chemically similar compound with no effectivity as antifouling agent.

The plates of Samples (1) to (4) had no tube worms, and at the edges there was a small growth of barnacles. The same results were obtained with sample (7) and (8). These compared well with comparative sample (9) and (10). Sample (5) had a small growth of barnacles and tube worms, especially at the edges. It is one of the main advantages of the antifouling paints of the invention that contamination of the environment with heavy metal ions is avoided or substantially reduced.

TABLE I

| | Toxicant | Concentration of Active Ingredient | Activity After 8 Months |
|---|---|---|---|
| 1 | Example 1 | 20% | + + |
| 2 | Example 2 | 20% | + + |
| 3 | Example 3 | 20% | + + |
| 4 | Example 4 | 20% | + + |
| 5 | Example 5 | 20% | + |
| 6 | Example 6 | 20% | − |
| 7 | Example 1 + *TBTO | 12.5% + 4% | + + |
| 8 | Example 1 + Example 2 + TBTO | 10% + 10% + 4% | + + |
| 9 | Copper oxide | 30% | + + |
| 10 | TBTO | 20% | + + |

+ + good protection
+ slight protection
− no protection
*TBTO = tri n-butyl tin oxide

I claim:
1. An antifouling paint for marine use comprising a conventional paint base of the type used with antifouling paints, containing as active ingredient an effective quantity of a compound of the formula

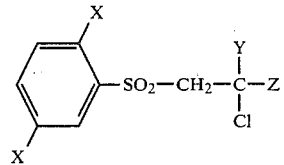

wherein
X is selected from the group consisting of chlorine and bromine;
Y is selected from the group consisting of hydrogen and lower alkyl, and
Z is selected from the group consisting of —COOR where R is lower alkyl.
2. An antifouling paint according to claim 1, containing as additional active ingredient a quantity of a conventional metal compound used in antifouling compositions.
3. A paint according to claim 2, wherein the additional ingredient is selected from copper oxide and from tri n-butyl tin.
4. A paint according to claim 1 wherein the active ingredient is 2,5-dichlorophenyl β-chloro, β-methyl β-carboxymethylethyl sulfone.
5. A paint according to claim 1 wherein the active ingredient is 2,5-dibromophenyl β-chloro, β-methyl, β-carboxymethylethyl sulfone.

* * * * *